Oct. 9, 1951 — J. C. HAUN — 2,570,673
JOINT SEAL

Filed April 9, 1947 — 3 Sheets-Sheet 1

INVENTORS
Joye C. Haun, Deceased,
By Florence Patricia Mills, Executrix
and John H. Carter
By Albert G. McCaleb
Attorney Oct. 9, 1951
J. C. HAUN
2,570,673
JOINT SEAL
Filed April 9, 1947
3 Sheets-Sheet 2
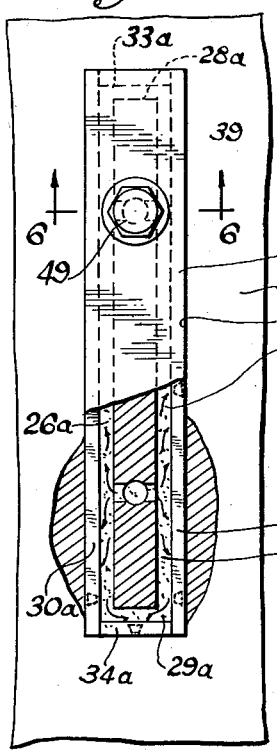
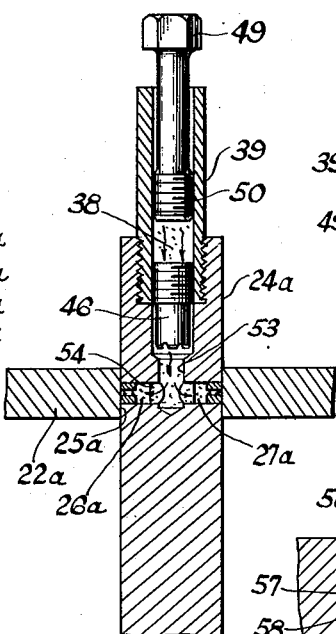
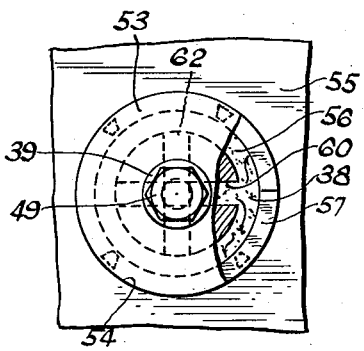
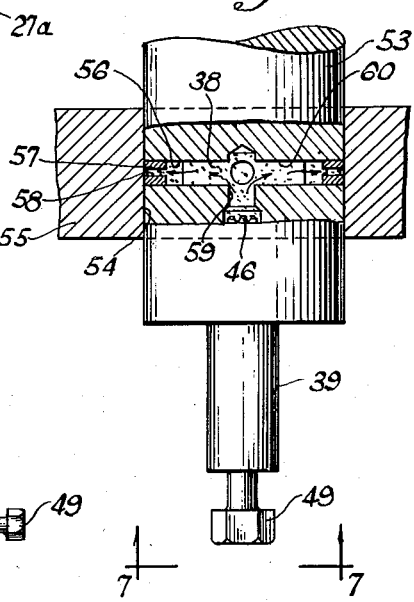
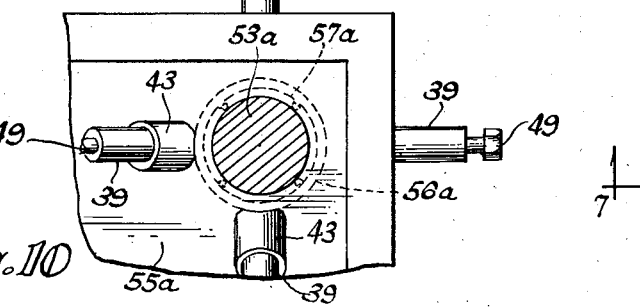
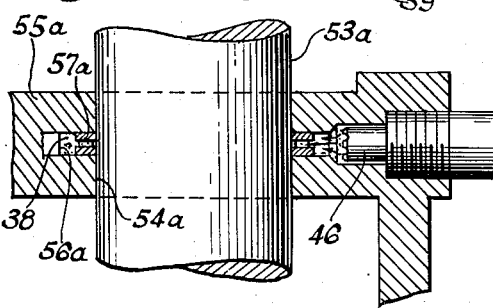
INVENTORS
Joye C. Haun, Deceased
By Florence Patricia Mills, Executrix
and John H. Carter
By Albert S. M. Caleb
Attorney

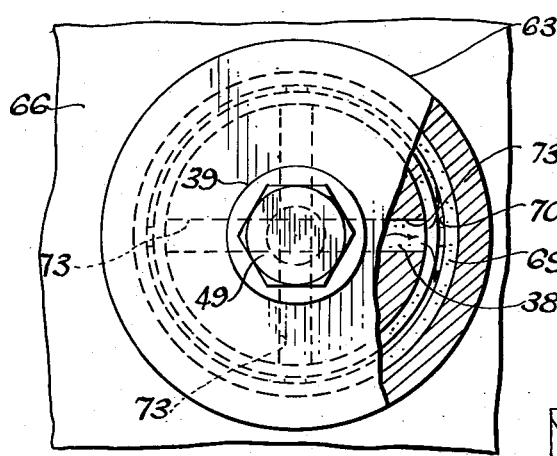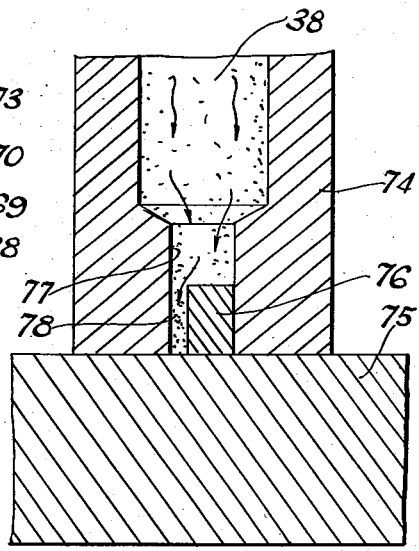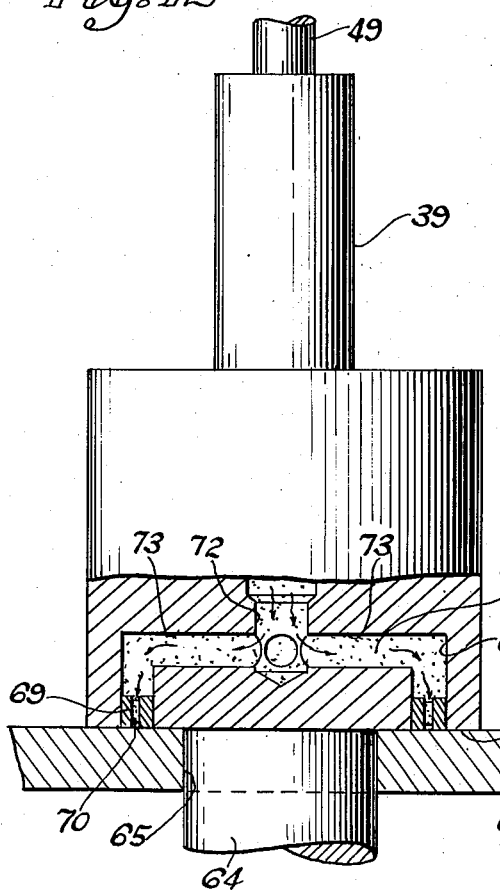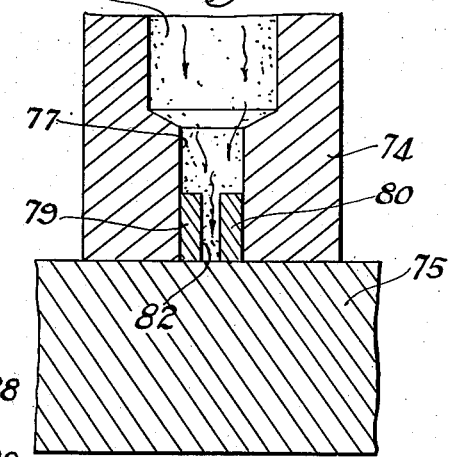

Patented Oct. 9, 1951

2,570,673

UNITED STATES PATENT OFFICE 2,570,673

JOINT SEAL

Joye C. Haun, deceased, late of San Francisco, Calif., by Florence Patricia Mills, executrix, Wallowa, Oreg., and John H. Carter, Portland, Oreg., assignors to Electric Steel Foundry, Portland, Oreg., a corporation of Oregon, and Florence Patricia Mills, Wallowa, Oreg.

Application April 9, 1947, Serial No. 740,306

1 Claim. (Cl. 286—38)

This invention relates to seals applicable to joints of various shapes and types, and capable of sealing such joints against the passage of fluid under pressure.

Each of the various forms of joint seals disclosed herein makes use of, and depends for its ultimate seal upon a plastic metallic gasket. The packing materials used for the formation of such gaskets are not new per se, but are, in general, composed of a semi-solid, plastic or viscous carrying medium to which finely divided metallic particles are added to obtain the desired characteristics and consistency. The metallic particles used are usually of the softer varieties such, for example, as lead; while the carrying medium is such that it suspends the metallic particles and will flow under pressure with the metallic particles added thereto. Chlorophene rubber or neoprene flour mixed with a plasticizing agent may be used as a carrier. Both the metallic particles and carrier medium should be inert to the fluid for which the seal is intended.

Plastic metallic gasket material of the type referred to and suited to use in the presently disclosed instances remains flexible when subjected to high pressures and is capable of flow or distortion to attain intimate and effective sealing contact with angular, irregular, rough or porous surfaces.

The invention, in the present instance, is related generally and particularly to manners and structures for making effective use of plastic metallic gasket materials of the type referred to in providing seals for joints between normally separable or relatively movable parts.

One of the objects of this invention is to provide a seal applicable to various sizes and shapes of joints and wherein a plastic metallic gasket is utilized to form an effective seal capable of confining fluid under pressure.

As another object the invention was within its purview the provision of joint seals of the class referred to in which the plastic metallic gasket material is extruded under pressure through one or more slotted elements conforming to the joint contours and adapted to limit the thickness of the formed gasket, while establishing a continuous gasket formation between adjoining surfaces.

Another object of the present invention is to provide joint seals wherein plastic gasket material of relatively high viscosity is fed to the joint from one or more controlled pressure chambers through a flow passage of ample sectional area spaced from the joint and from whence the material is extruded to the surface of the adjoining part in a layer of sufficient thickness for adequate material flow and sealing purposes, but limited in thickness to prevent it from producing sufficient adhesion between the adjoining parts to render their relative movement unduly difficult after effecting the seal.

The invention has for a further object the provision of a joint seal adapted to the use of plastic gasket material and in which a groove in one of two adjoining parts opens toward the other and has suitable dimensions and sectional area to form a flow passage for the gasket material and to carry a space restricting strip adjacent the open edge of the groove across which the material flows to the adjoining surface of said other of the parts to form a sealing gasket of limited thickness.

A further object of the invention is to provide a fluid-tight seal adaptable to joints of various shapes and which avoids the necessity of grinding or polishing the sealing surfaces, as well as the need for a tight or precision fit between the adjoining parts.

Other objects and advantages of the invention will be apparent from the following description and the accompanying drawings in which similar characters of reference indicate similar parts throughout the several views.

In the three sheets of drawings:

Fig. 5 is a fragmentary top plan view having a portion cut away to illustrate internal structure, and which shows a modified form of joint seal in its application to a joint of somewhat the same type as that illustrated in Figs. 1, 2 and 3;

Fig. 6 is a fragmentary side sectional view with the section taken substantially on a line 6—6 of Fig. 5 and viewed in the direction indicated by the arrows;

Figure 1:
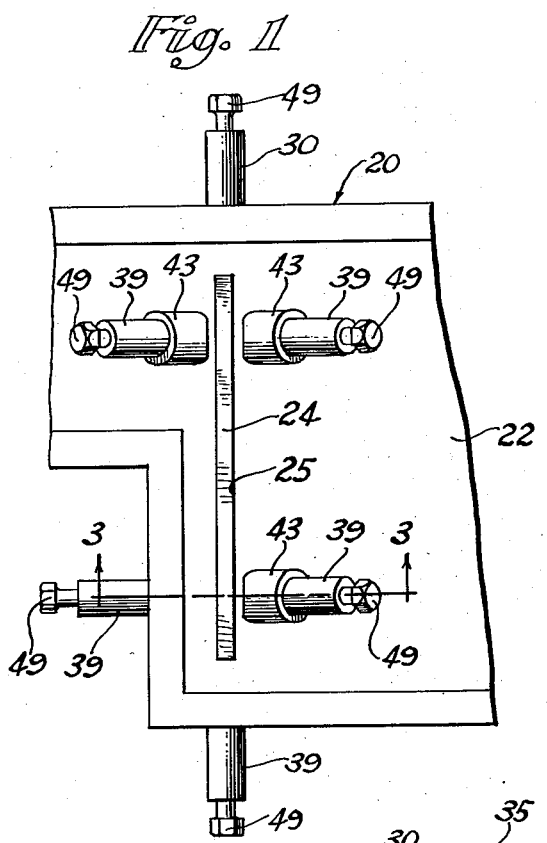
Fig. 1 is a fragmentary top plan view depicting the application of a preferred form of this invention to the sealing of a joint having rectangularly disposed surfaces.

Fig. 7 is a plan view taken as indicated by a line 7—7 and the accompanying arrows in Fig. 8, which view has a portion cut away to show internal structure, and depicts one adaptation of this joint seal to a joint of circular shape;

Fig. 8 is a side sectional view of the joint seal illustrated in Fig. 7;

Fig. 9 is a top plan view showing a modification of the present joint seal in its application to a joint of circular contour;

Fig. 10 is a fragmentary side sectional view of the joint seal depicted in Fig. 9;

Fig. 11 is an end view wherein a portion of the structure is cut away to show internal parts of an adaptation wherein the present joint seal is applied to a step joint between parts, one of which is circular;

Fig. 12 is a side view partially in section and partially in elevation of the joint seal shown in Fig. 11; and Figs. 13 and 14 are each fragmentary side sectional views depicting modifications of a portion of the structure applicable to the previously illustrated types of joint seals.

Although the various views of the drawings, which are provided for exemplary purposes, illustrate the adaptation of seals to various types and shapes of joints, the fundamental principal embodied in each of the adaptations is substantially the same. That is, the seals of this invention each embody two parts having adjacent opposed surface portions between which a fluid-tight seal is to be effected. In each instance, one of the parts has a groove of rectangular section opening toward the surface of the other part at which the seal is to be provided. In that groove and adjacent the other of the parts, a strip-like element separate in structure from either of the parts is so constructed and disposed that it restricts the open side of the groove to a relatively narrow slot. That strip-like element, however, leaves the base portion of the groove open to serve as a flow channel or passage. At spaced positions along the groove, and in communication therewith, are passages for the introduction of a plastic metallic gasket material under pressure. This plastic metallic gasket material is utilized to produce the ultimate fluid-tight seal between the parts.

Referring more in detail to the accompanying drawings and particularly to Figs. 1 to 4, inclusive, the reference numeral 20 designates a form of conduit or container adapted to the carriage of fluid under pressure and having wall plates, such as 22 and 23, secured together along their adjacent edges. In the disclosed embodiment of the invention, the container or conduit 20 is provided with a movable septum 24 extending through a slot 25 in the wall plate 22, which slot is of an appropriate shape and size to fit the outer surface of the septum 24 and permit its linear movement into and from the container. It may be readily appreciated that the position of the septum within the container determines the restriction or baffle effect which it provides.

Since the container is adapted to use with fluid under pressure, a satisfactory seal for retaining the encountered pressure must also be provided for the joint between the septum and the plate 22 through which it extends. Such seal, while being effective for sealing purposes, should, in the present instance, also permit the movement of the septum to vary its position within the container.

Figure 3:
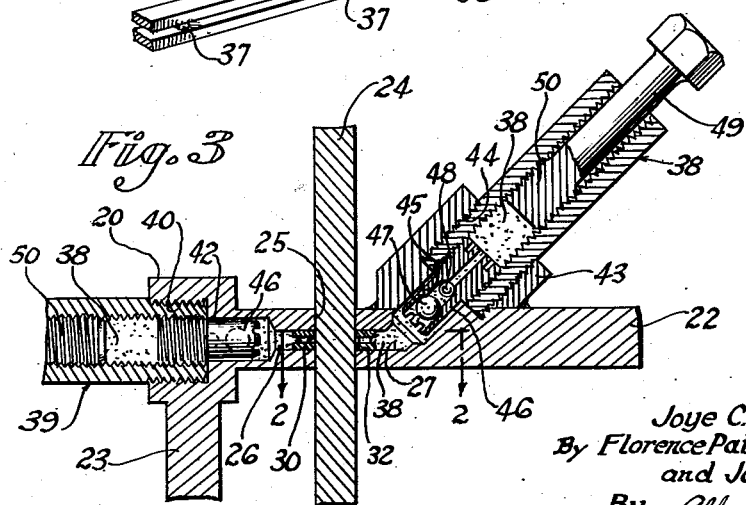
Fig. 3 is a fragmentary side sectional view drawn to an enlarged scale with the section taken substantially on a line 3—3 of Fig. 1.

In the present instance, and since the section of the septum is rectangular, the seal for the joint between that septum and the wall plate 22 includes oppositely disposed grooves 26 and 27 as well as opposed grooves 28 and 29, which grooves have adjoining ends and are all in the wall plate 22 opening toward the side and end faces of the septum 24 within the slot 25. These grooves, as depicted in Fig. 3, are desirably rectangular in section, and together form a channel completely encircling the septum. Also, by preference, the depth of each of the grooves 26, 27, 28 and 29, measured from the open face thereof, is approximately equal to twice the distance between the opposed side wall surfaces thereof. Longitudinally, the opposed side wall surfaces of the grooves are desirably straight and parallel.

Since it is proposed, in the present instance, to utilize a plastic metallic gasket material for effecting the fluid-tight seal between the wall plate 22 and the septum 24, which gasket material is to be carried under pressure by the grooves 26, 27, 28 and 29, the sectional dimensions of the grooves must necessarily be substantial and proportioned to the resistance of such material to flow therethrough and therealong, so as to avoid the necessity of introducing the material under pressure at positions very closely spaced from one another. On the other hand, it has been found that a very satisfactory and effective seal suitable for withstanding very substantial pressures may be obtained with a layer of the plastic metallic gasket material which is relatively thin. The thin layer of the gasket material is additionally advantageous in that it tends less to cause seizing or sticking between the relatively movable parts, especially after they have been sealed together in a predetermined position for a period of time. With a leaded plastic gasket material of the type previously referred to, it has been found that a gasket thickness of, for example, one-sixteenth of an inch, is quite satisfactory.

Figure 4:
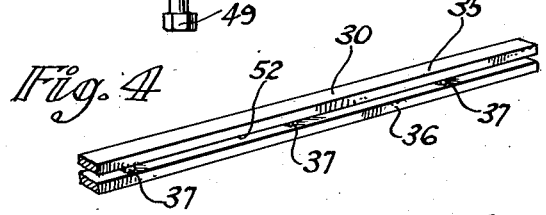
Fig. 4 is a fragmentary perspective view of a portion of the structure illustrated in the joint depicted in Figs. 2 and 3.

To accomplish the restriction of the sealing gasket thickness without unduly limiting the flow of the gasket material through the grooves and without complicating the machining of those grooves, strip-like elements 30, 32, 33 and 34, of the form and structure disclosed in Fig. 4, are inserted in each of the grooves 26, 27, 28 and 29, respectively, adjacent the open faces of the grooves and thus adjacent the surfaces of the septum 24. The width of those strip-like elements, measured from the open faces of the grooves, is desirably about half the depth of the grooves so as to leave a passage of substantial sectional area in the base portions of the grooves for the flow of gasket material longitudinally along the grooves. With material under pressure behind the strip-like elements, the pressure of the material also has the tendency to force the strip-like elements outwardly of the grooves and toward the surfaces of the septum.

Figure 2:
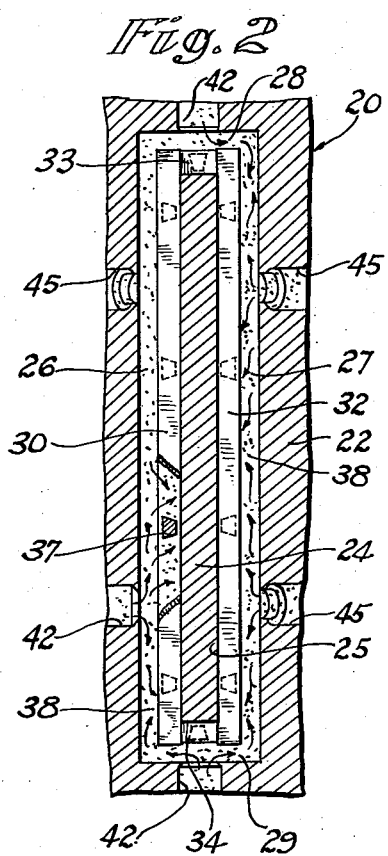
Fig. 2 is a fragmentary sectional view drawn to an enlarged scale and wherein the section is taken substantially as indicated by a line 2—2 in Fig. 3 and the accompanying arrows.

It is by further preference that, as shown in Fig. 2, butt joints are provided between the adjacent end portions of the strip-like elements so that together they completely encompass the outer surface of the septum. Those joints between the strip-like elements might also be beveled. As shown in Fig. 4, the preferred type of strip-like element, which is utilized in exemplary joint seals of the present disclosure, includes two opposed and longitudinally extending side strip portions 35 and 36 of similar sectional size and held in spaced and parallel relationship by integrally formed spacers 37 disposed at longitudinally separated positions between the strips.

On account of the high viscosity of the plastic gasket material, it is not necessary that the fit of the strip-like elements within and between the opposed parallel surfaces of their respective grooves shall be particularly tight to prevent the extrusion of the gasket material outwardly of the grooves and between the opposed parallel surfaces thereof and the strip-like element. It is desirable, however, that the fit of the strip-like elements within the respective grooves shall be sufficiently close to prevent the extrusion of the gasket material along the outer surfaces of the strip-like elements.

A sealing gasket of the desired thickness is formed, in the present instance, by the extrusion of the gasket material from the inner passages of the grooves between the side strip portions 35 and 36 of the strip-like elements. A gasket thus formed impinges under pressure against the adjacent surface of the septum to effect intimate sealing contact therewith. In order to prevent interruptions or breaks in the continuity of the sealing gasket along a continuous surface of the septum, the spacers 37 are of limited sectional area and spaced inwardly of the side strip portions from the edges thereof which normally lie adjacent the surfaces of the septum.

One satisfactory manner of introducing plastic metallic gasket material, such as that depicted at 38 in Figs. 2 and 3, into the grooves under pressure is through the use of pressure cylinders 39, an exemplary form of which is shown in detail in Fig. 3. When the joint at which the seal is to be effected is near an exposed edge of the container, the pressure cylinder may be threaded into a bore 40 extending inwardly from the edge of the container in alignment with the wall plate 22 and communicating through an extended bore 42 with the groove 26, as shown in Fig. 3. When the groove, such as 27, is disposed in a portion of the wall plate 22 wherein access can only be obtained thereto with convenience through one face of the wall plate, a fitting 43 is secured to an exposed face of the wall plate by means such as welding and has a threaded bore 44 therein for receiving the pressure cylinder. From the threaded bore 44, communication with the groove 27 is provided by a coaxial bore 45 disposed angularly with respect to the general plane of the wall plate. By preference, each of the pressure cylinders has in its end adjacent one of the grooves a pressure-responsive ball check valve 46 including balls 47 and 48 and coacting seats therefor disposed in a manner such that the pressure of the gasket material within the grooves is maintained even though the pressure is relieved within the pressure cylinder. A supply of the gasket material is introduced into the pressure cylinders through the outer ends thereof while the respective plungers 49 are removed therefrom. The plungers 49 having end portions 50 threaded into the interior of the pressure cylinders, the gasket material is forced into the adjacent portions of the grooves by manually turning the plungers 49.

In order to improve the equalization of the gasket pressure throughout the lengths and in the various portions of the grooves and so as to attain equalized and improved flow, as well as desired high pressures within the grooves, the pressure cylinders are desirably spaced at positions along the grooves as indicated in Figs. 1 and 2.

From the description thus far, it may be readily understood that through the introduction of a suitable plastic metallic gasket material into the pressure cylinders 39, and by the application of pressure to such material within the pressure cylinders, it is forced into the grooves for flow along the open base portions of the grooves and for extrusion through a longitudinal slot 52 of limited and predetermined thickness between the side strip portions 35 and 36 of the strip-like elements 30. The gasket material which is extruded through the slot 52 is forced into contact with the adjacent surface of the septum 24 to form a continuous fluid-tight seal for the joint surrounding the entire peripheral surface of that septum. With the relatively thin layer of the extruded gasket material formed by the use of the slotted strip-like elements, there is insufficient adhesion of the gasket material to the surfaces of the septum to prevent its being forcibly moved when desired. With this type of seal, an effective sealed joint may be obtained at any position of the septum relative to the wall plate 22.

In the modified form of the invention which is illustrated in Figs. 5 and 6, a structure is disclosed for effecting the sealing of a joint between plate-like parts, such as a container wall plate 22a and a septum 24a. In this instance, however, the septum rather than the wall plate, has therein a peripheral series of communicating grooves 26a, 27a, 28a and 29a at at least one position on the surface thereof at which it is desired to effect a sealed joint between the parts. A plurality of such series of communicating grooves may be utilized at specified positions along the septum if seals are to be obtained between the parts at more than one position. In such an instance, separate pressure cylinders are utilized to apply gasket material under pressure to the different grooves.

When the grooves are in the septum, as shown in Figs. 5 and 6, the pressure cylinders are desirably disposed at spaced positions along an exposed edge of the septum and communicate with the grooves through a bore 53 which is coaxial with the pressure cylinder and a cross bore 54 which connects the bore 53 to the grooves on opposite sides of the septum. The proportions of the parts and the structure of the strip-like elements in this instance are desirably similar and as disclosed with respect to the seal shown in Figs. 1 to 3, inclusive.

In Figs. 7 and 8, a structure is disclosed for effecting a fluid-tight seal between parts having opposed and adjacent circular surfaces. In this instance, a shaft 53 extends through a bore 54 in a part such as a plate 55. A circumferential groove 56, preferably of rectangular section, is provided in the shaft 53 at a position such that it opens toward the mid-portion of the plate 55 at the position in which the seal is to be effected. A strip-like element 57 of circular shape and otherwise constructed in a manner similar to the straight strip-like element 30 shown in Fig. 4, is mounted in the groove 56 adjacent the surface of the plate 55. The proportions of the groove and strip-like element are similar to those described with respect to the other forms of the invention, so that plastic metallic gasket material flows around the inner portion of the groove and is extruded outwardly through a slot 58 to effect the seal between the parts.

In this instance, the pressure cylinder 39 is mounted in the end of the shaft and in substantial coaxial relationship thereto. A ball check valve 46 is desirably used as in the previously described forms. Communication from an axial bore 59 in the shaft is provided to circumferentially spaced positions around the groove by a plurality of cross bores, such as 60 and 62, to aid in the flow of gasket material to the groove and to equalize the pressure throughout the portions of the groove.

In Figs. 9 and 10, another shaft seal is disclosed in which the sealing groove is in the plate-like part rather than in the shaft, somewhat like the seal disclosed in Figs. 1 to 3. That is, a shaft 53a extends through a bore 54a in a plate 55a. A circumferential groove 56a in the mid-portion of the plate 55a opens toward the shaft 53a and is adapted, as in the previous instances, to carry a strip-like element 57a of circular contour through which gasket material is extruded to form an effective fluid-tight seal around the shaft surface. As in the form of the invention disclosed in Figs. 1 to 3, the plastic gasket material is supplied at spaced positions along the groove by a plurality of pressure cylinders 39 which communicate with the groove either through an adjacent edge of the plate 55a or through angularly disposed and circumferentially spaced fittings 43. The proportions, functions and operations of the sealing parts are similar to those disclosed with respect to other forms of the invention.

Figs. 11 and 12 disclose a structure by which the joint seal of the present invention is applied to a step or shoulder joint between a shaft 63 or the like having a portion 64 extending through a bore 65 in a plate 66, and wherein a substantially planar shoulder surface 67 of the shaft abuts the adjacent plane surface of the plate.

In the disclosed embodiment of this form of the invention, an annular groove 68 extends inwardly in a direction axially of the shaft from the planar shoulder surface 67 and is substantially concentric with respect to the shaft axis. A circular strip-like element 69 differs from those utilized in the forms of my invention disclosed in Figs. 7 to 10, inclusive, in that a slot 70 therethrough extends in a direction axially of the shaft rather than in a radial direction. This, however, as in the previous instances, serves to extrude the plastic metallic gasket material toward and into engagement with the opposed surface of the adjacent part. As in the form of the invention shown in Figs. 7 and 8, this form also has the pressure cylinder 39 disposed in the end of the shaft and an axial communicating opening 72 serves to apply gasket material to a plurality of radially extending passages 73 which enter the inner portion of the groove at spaced positions.

Figs. 13 and 14 illustrate joints between adjacent parts 74 and 75 in each instance, which parts may be of either planar or circular shape, as illustrated in the previously disclosed forms of the invention, but in each of the views a modified form of the strip-like element is depicted.

In Fig. 13, a strip-like element 76 presents a unitary rectangular sectional shape and is adapted to placement adjacent one plane side surface of a groove 77, as well as adjacent the open face of the groove. The sectional dimensions of the strip-like element in this form of the invention are such that an extrusion slot 78 for the plastic gasket material is formed between one planar outide surface of the strip-like element and an opposed and parallel planar surface of the groove 77. This slot limits the sectional thickness of the gasket, as in the previously disclosed form of strip-like element. Also, as in the case of the initially described form, the extent of the strip-like element into the groove is limited to provide a passage for the flow of gasket material along the inner portion of the groove, as well as outwardly through the extrusion slot 78.

In the modification of the invention which is disclosed in Fig. 14, two similar and opposed strip-like elements 79 and 80 are mounted within the groove 77 adjacent the opposite and parallel side surfaces thereof to define an extrusion slot 82 for the gasket material between opposed surfaces of those elements. The sectional shapes and proportions of the strip-like elements 79 and 80 are preferably such that the function and operating characteristics of the strip-like elements are similar to the previously described forms, although in this instance the gasket material is extruded through an entirely open slot between the separate parts.

In utilizing the strip-like elements shown in Figs. 13 and 14, those elements may be initially held in place during assembly by placement of one or more small quantities of the gasket material between the parts at the position in which the extrusion slot is to be formed. After the application of the gasket material to the groove under pressure, the pressure of that material will hold the strip-like elements in their proper positions as well as urging them toward the opposed sealing surface.

While we have illustrated a preferred embodiment of our invention, many modifications may be made without departing from the spirit of the invention, and we do not wish to be limited to the precise details of construction set forth, but desire to avail ourselves of all changes within the scope of the appended claim.

Having thus described our invention, what we claim as new and desire to secure by Letters Patent of the United States is:

In a fluid-tight seal for a polygonal joint wherein a plastic metallic gasket material is utilized to accomplish the sealing function, the combination comprising two parts having adjacent polygonal surface portions disposed in opposed relationship and between which a seal is to be effected, one of said parts having a continuous polygonal groove therein composed of a plurality of straight groove portions extending peripherally of the polygonal surface thereof and opening toward the adjacent polygonal surface of the other part, said straight groove portions each having opposed parallel surfaces adjacent and extending angularly away from a portion of the polygonal surface of said other part, a plurality of strip-like elements equal to the number of said straight groove portions disposed between said opposed parallel surfaces of the groove portions, said strip-like elements having engaging end portions and together forming a closed polygon adjacent the polygonal surface of said other part, said strip-like elements being narrower than the depth of said groove portions from the open sides thereof to provide a continuous passage for the flow of gasket material in the inner portion of the groove, said strip-like elements also having a thickness between said opposed parallel surfaces such that they restrict the open sides of the groove to an amount materially less than the distance between said opposed parallel surfaces of the groove portions so as to form a restricted peripheral slot for the extrusion of gasket material under pressure against said polygonal surface of the other part, and means in communication with said groove for supplying gasket material thereto under pressure, said means in communication with the groove for supplying gasket material thereto under pressure comprising a cylindrical supply chamber communicating with a plurality of separated parts of said groove through a plurality of supply passages, and means for applying pressure to material in said supply chamber.

FLORENCE PATRICIA MILLS,
*Executrix of the Last Will and Testament of Joye S. Haun, Deceased.*
JOHN H. CARTER.

REFERENCES CITED

The following references are of record in the file of this patent:

UNITED STATES PATENTS

| Number | Name | Date |
| --- | --- | --- |
| 596,303 | O'Neill | Dec. 28, 1897 |
| 1,371,308 | Hiller | Mar. 15, 1921 |
| 1,821,274 | Plummer | Sept. 1, 1931 |
| 2,307,346 | Allen | Jan. 5, 1943 |
| 2,308,399 | Strecker et al. | Jan. 12, 1943 |
| 2,504,496 | Carter | Apr. 18, 1950 |